United States Patent [19]

Venetos et al.

[11] Patent Number: 5,056,313
[45] Date of Patent: Oct. 15, 1991

[54] THREE PISTON MASTER CYLINDER

[75] Inventors: Brad N. Venetos, Spring Valley; Tomas L. Shroyer, Centerville; Kenneth R. Hous, Beavercreek, all of Ohio

[73] Assignee: General Motors Corporation, Detroit, Mich.

[21] Appl. No.: 607,124

[22] Filed: Nov. 1, 1990

[51] Int. Cl.$^5$ .......................... B60T 11/28; F15B 7/08
[52] U.S. Cl. ........................................ 60/562; 60/589; 303/113
[58] Field of Search ................. 60/562, 567, 568, 570, 60/574, 579, 585, 588, 590, 589; 303/113

[56] References Cited

U.S. PATENT DOCUMENTS

| | | | |
|---|---|---|---|
| 3,800,538 | 4/1974 | Jones | 60/562 |
| 4,550,567 | 11/1985 | Schaefer | 60/562 |
| 4,621,498 | 11/1986 | Schaefer | 60/562 |
| 4,707,989 | 11/1987 | Nakamura et al. | |
| 4,793,139 | 12/1988 | Reynolds | 60/585 X |
| 4,798,422 | 1/1989 | Becker | 303/113 X |
| 4,891,945 | 1/1990 | Becker | 60/562 X |
| 4,932,312 | 6/1990 | Sugimoto | 60/562 X |
| 4,949,542 | 8/1990 | Pruett | 60/562 X |

FOREIGN PATENT DOCUMENTS 2211567A 7/1988 United Kingdom.

*Primary Examiner*—Edward K. Look
*Assistant Examiner*—John Ryznic
*Attorney, Agent, or Firm*—Ernest E. Helms

[57] ABSTRACT

A dual brake circuit master cylinder with center compensation on the second circuit is provided. The master cylinder has a second piston mounted within a housing bore sealably separating a second reservoir passage from the second brake circuit passage when the pressure within the bore exposed to the second brake circuit passage exceeds the pressure within the bore exposed to the second reservoir passage. The second piston also has a compensating passage with an inclusive valve seat with an inserted compensating valve allowing fluid communication between the second reservoir and second brake circuit passages when the pressure in the second reservoir is greater than the pressure in the brake circuit. An auxiliary piston is provided to insure that the second compensating valve is retained to an open position when ever the second piston is in a retracted position and excessive pressure in the brake second circuit has acted to close the second compensating valve.

5 Claims, 1 Drawing Sheet

5,056,313

THREE PISTON MASTER CYLINDER

FIELD OF THE PRESENT INVENTION

The field of the present invention is that of an apparatus and method of utilization thereof of a dual brake circuit vehicle master cylinder with center compensation in the secondary brake circuit. More particularly, the field of the present invention is that of master cylinders as described above specified for use with vehicles having antilock braking system (ABS) or traction control (TC) systems.

DISCLOSURE STATEMENT

Typical master cylinders in use in automotive vehicles for many years are the dual or tandem type; that is they have two pressurizing chambers in a common main bore having a closed end and an open end, with brake fluid being pressurized by a sealed primary piston and a sealed secondary piston arranged in tandem in the main bore. One of the chambers is typically connected to one brake circuit, such as one containing the vehicle front brakes and the other chamber is typically connected to another brake circuit containing the rear brakes. At times other circuit arrangements such as a cross circuit can be, used.

Such a master cylinder usually has a pair of holes in the main body adjacent each of the primary and secondary piston seals. The holes are connected with the master cylinder reservoir and extend into the main bore. One of the holes is a compensating port located behind the seal of the associated piston. The other hole is a bypass hole positioned in front of the seal of the associated piston. When the master cylinder is actuated, the seals move across their respective bypass hole so that these hole are no longer fluidly connected with the pressurizing chambers, and the brake fluid in those chambers and the brake circuits connected with them can be pressurized to actuate the brakes. The seals are usually cup like lip seals or V-blocked seals with lips which can be subject to seal extrusion into the bypass hose under some conditions, resulting in possible damage to seal and possible lowering of full functioning pressure generation for the brake circuit associated with the damaged seal. In normal service braking operation there is little pressure in the pressurizing chambers until the bypass hole are closed, so extrusion into these holes is minimized. However, with the advent of ABS and TC systems the modulation of brake pressures in the brake circuits when that type system is operating can cause rapid travel of the secondary piston seal back and forth across the bypass hole. The secondary piston is subject to greater displacement since it is effected by the pressure in both brake circuits and is usually positioned by two opposing springs. That is the bypass hole associated with the forward pressurizing chambers in the master cylinder bore.

To alleviate the aforementioned problems commonly assigned Pugh U.S. Ser. No. 07/331,930 filed Apr. 3, 1989 has been brought forth. Pugh provides a structure which eliminates the usual front bypass hole and provides an internal path for brake fluid compensation typically referred to as center compensation.

Pugh provides an internal path for brake fluid compensation and bypass. Pugh provides a valve located in the secondary piston within the master cylinder main bore. The valve is open when the master cylinder is at a rest (non-actuated) or release position and is closed by actuating movement of the secondary piston. The valve will also reopen when the secondary piston is returned to the rest position.

A more detailed explanation of the workings of center compensating master cylinders can be gained by review of Pugh.

As mentioned previously center compensating master cylinders are often utilized with ABS or TC systems. Most center compensating master cylinders are designed such that the compensating valve will automatically open when the master cylinder is retracted to the released position. However, on certain occasions excessive pressure can sometimes occur within the brake circuit causing the compensating valve to be forced by the pressure within the brake circuit entering the master cylinder to the closed position. If the pressure within the braking system due to the operation of the ABS or TC system or possible malfunction of the same is excessive it could possibly cause wear or damage to the seals of the master cylinder.

To eliminate the possibility of the above occurrence in the secondary pressure chamber (the chamber towards the closed end of the master cylinder main bore sometimes referred to as the forward pressure chamber) some have provided stopping mechanisms within the master cylinder which forceably open the compensating valve whenever the secondary piston comes to a rest position. However, the above-mentioned mechanical stop typically requires the main bore of the master cylinder to be machined in such a manner so that the stop can be placed within the master cylinder bore. The stop requires additional cost in machining and also complicates fabrication of the master cylinder.

Another method of insuring that the compensating valve in the secondary pressure chamber remains open in a master cylinder as shown in Pugh is to drill a transverse threaded hole in the chamber and place therein a set screw. The set screw will fix the position of the spring retainer for the secondary piston return spring against the closed end of the master cylinder main bore. The travel of the secondary compensating valve towards the secondary piston is limited by a stop or head on the compensating valve stem, which is mounted in an aperture of the secondary spring retainer. Therefore pressure within the secondary pressure chamber will move the secondary piston to such a position to insure the opening of the compensating valve. Again there exist the invasive requirements of drilling another transverse bore into the main bore of the master cylinder.

It is desirable to provide center compensation for the master cylinder secondary pressure chamber with a mechanism to ensure that the secondary compensating valve is in an open position when the secondary piston is at a released position regardless of the pressure within the secondary brake circuit. It is also desirable to provide the above without a transverse bore having to be drilled and a physical stop being inserted therein in the secondary pressure chamber of the master cylinder bore.

SUMMARY OF THE INVENTION

To overcome the above noted problems and to meet the unmet challenges as noted above the present invention is brought forth. The present invention provides a secondary pressure chamber center compensating master cylinder with a positive open by providing an auxiliary piston which will hydraulically always maintain the compensating valve in an open position regardless of the pressure within the secondary circuit of the braking system when the secondary piston is in the rest position. Therefore, if excessive pressure should occur within the secondary brake circuit due to the operation of the ABS or TC system the pressure within the master cylinder secondary pressurizing will cause the auxiliary piston to retain the secondary compensating valve stem in an open position when the secondary piston is in a rest position. Since the auxiliary piston will have a pressure area larger than the pressure area of the secondary compensation valve head over the retention compensation passage of the secondary master cylinder piston, retention of the secondary compensating valve to the open position whenever the secondary piston is retracted to the release position is totally assured.

It is an object of the present invention to provide an apparatus and method of utilization thereof of a positive open center, compensating for the secondary chamber of a master cylinder.

Other objects, desires and advantages of the present invention can become more apparent to those skilled in the art as the nature of the invention is better understood from the accompanying drawings and a detailed description.

DETAILED DESCRIPTION OF THE DRAWINGS

Figure 1:
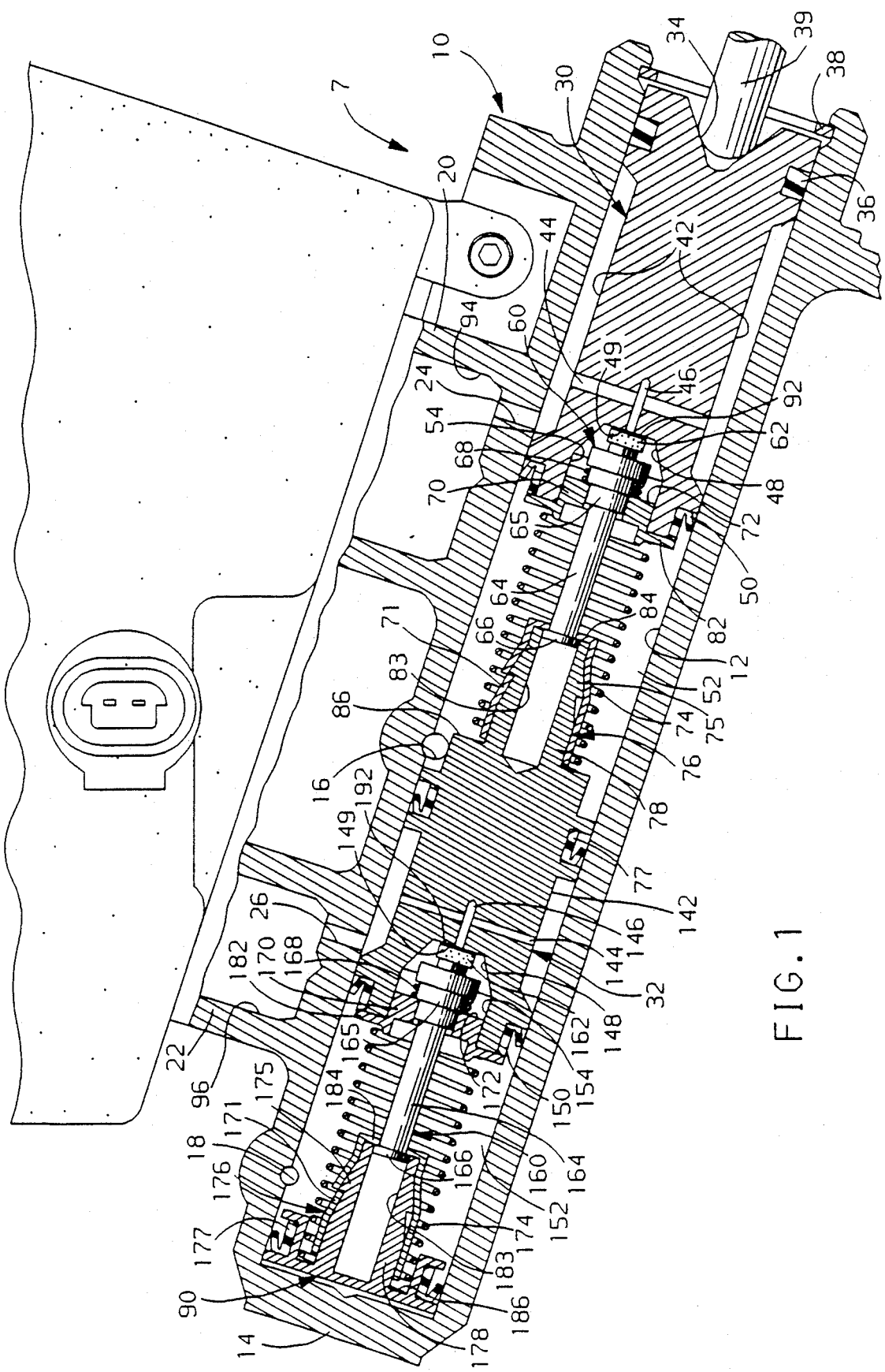

FIG. 1 is a sectional view of a preferred embodiment of the present invention.

DETAILED DESCRIPTION OF THE DRAWINGS

Referring to FIG. 1 the master cylinder 7 has a frame 10. The frame has a longitudinal main bore 12 with a blind or closed end 14. Intersecting with the longitudinal bore 12 is a primary brake circuit passage 16 and a secondary brake circuit passage 18. The master cylinder 7 has a primary boss 20 and a secondary boss 22 for mounting with a reservoir. The bosses 20 and 22 have reservoir mounting bores 94 and 96, respectively. Bores 96 and 94 have an intersecting reservoir passage. The mounting bore 94 having a reservoir passage 24 and the mounting bore 96 having an associated reservoir passage 26. Both of the reservoir passages intersect with the longitudinal bore 12.

In the embodiment of the invention shown center compensation is provided for both of the brake circuits of the master cylinder 7. The master cylinder is provided with a primary piston 30 and a secondary piston 32. Primary piston 30 has an end 34 for connection with a push rod 39 which is operationally associated with a vehicle operator manipulated pedal directly or as in most instances via a hydraulic or pneumatic braking booster (not shown).

The primary piston 30 has a rearward seal 36 and in the fully retracted position rest against snap ring 38 (sometimes the fully retracted position is moved slightly forward due to mounting of the booster). Typically, the rearward seal 36 will be a simple O-ring. The primary piston 30 is sealed at its forward end by a cup-like lip seal or V-block type seal which seals the slidably mounted primary piston when the portion of the bore 12 exposed to first brake circuit passage 16 (pressure chamber 52) has a higher pressure than the portion of the bore 12 exposed to the reservoir passage 24.

The secondary piston 32 has a transverse bore 144 intersecting with a generally longitudinal, multidiameter and partially tapered bore 146. The bore 146 has a tapered section 148 and an enlarged section 154. A flat 142 on the secondary piston 32 along with bores 144 and 146 provide a secondary compensating passage for the secondary piston 32 which allows fluid communication between a second reservoir passage 26 and the secondary brake circuit passage 18. Also inclusive within the compensating passage is a valve seat 149 located on the secondary piston 32.

Mounted within the secondary compensating passage in a slip fit is a spring retainer 170. The spring retainer 170 has a flange member 182 which limits the travel of the spring retainer 170 with respect to the secondary piston 32 and has an inner support surface 172. The retainer 170 also mounts the piston return spring 174. Mounted within an inner diameter of the spring retainer 170 and within the compensating passage is a secondary compensating valve 160. The compensating valve 160 is compliantly biased against the valve seat 149 by a coil spring 168. To make contact with the valve seat 149 there is provided an elastomeric tip 162 to a head section 165. The secondary compensating valve 160 has a stem portion 164 with an enlarged end 166. An auxiliary piston 90 is provided within the bore 12 having has an extension 178 with a bore 183. Fitted within the extension 178 is a clip member 176. The clip member 176 has a finger section 184 which captures the enlarged end 166 of the secondary compensating valve stem. The clip member 176 has a tang 171 which interlocks with a head 175 of the extension 178.

An auxiliary (third) piston 90 is provided having a V-block seal 177 which seals within chamber 152 whenever there is pressure within the chamber 152. A surface 186 of the auxiliary piston 90 provides a mounting surface for the secondary piston return spring 174.

In the primary pressurizing chamber 52 components performing similar functions to those previously described for the secondary pressurizing chamber 152 are numbered in a similar fashion minus 100.

Within the first pressurizing chamber 52 there is a secondary piston 32 having a V-block seal 77 to seal the first pressurizing chamber 52 when the pressure within that chamber exceeds the pressure exposed to the reservoir passage 26.

At a rearward end secondary pressurizing chamber 152 is sealed by a V-block seal 150 on the secondary piston when the pressure within the chamber exceeds the pressure within the reservoir passage 26.

In operation in the released position, the secondary piston 32 is in the position shown. The primary piston 30 will be in the position shown having a slight clearance with a C-clip 38 due to the positioning of the brake booster (not shown). When the vehicle brakes are not actuated fluid will be allowed to flow from the reservoir passage 26 through the compensating passage via bores 144 and 146. The return spring 174 pushes against the secondary piston 32 causing the fingers 184 to pull upon the enlarged end of 166 of the compensating valve 160. The above biasing force ensures a slight clearance 192. The spring 168 has a very low spring constant and is therefore not able to overcome the force of the compensating valve head 165 being pulled back. Therefore, if expansion of the brake fluid due to temperature condition should occur within the secondary brake circuit pressurizing pressure chamber 152, the fluid will be allowed to exit out of secondary pressurizing chamber 152 and will be exposed to the reservoir passage 26.

Upon activation of the brake cylinder 7 the primary and secondary pistons 30,32 will be moved leftward. As the pressure rises within the secondary pressure chamber 152 the V-block seal 150 will seal off the pressurizing chamber 152. Movement of the secondary piston 32 to the left will cause compression of the return spring 174 allowing the spring 168 to seat the elastomeric tip 162 on the valve seat 149. Thereafter pressure within the pressure chamber 152 will maintain the elastomeric tip 162 of of the compensating valve against the valve seat 149. The above cuts off fluid communication between the secondary pressure chamber 152 and the reservoir passage 26.

The secondary pressurization chamber 152 will be sealed at its left end by the V-block seal 177 of the auxiliary piston. The enlarged end 166 of the secondary compensating valve 160 will slide within a bore 183 of the auxiliary piston extension 78. Pressurized fluid will be forced through the secondary brake circuit passage 18 to actuate the brakes of the secondary brake circuit which are typically connected to the brakes of the two rear wheels of a front-wheel-drive vehicle. Upon release of the brake the return spring 174 will return the secondary piston 32 to its at rest position wherein the secondary compensating valve 160 will again be retained leftward by the fingers 184 of the auxiliary valve extension and fluid communication between the reservoir passage 26 and the secondary brake circuit passage 18 will again be established. Since the area rearward of the seal 150 is continually exposed to the reservoir passage 26 problems of creating a vacuum to the right (rear) of the seal 150 are eliminated.

If there is excessive pressure within the secondary brake circuit after the secondary piston 32 has returned to the rest (retracted or non-actuated) position without applicant's invention the compensating valve 160 could easily be forced against the valve seat 149 if the pressure in the secondary pressurizing chamber 152 acting on the area of the tip 162 creates a force in excess of the spring force of the spring 174 (Note: spring 174 will usually have a lower spring constant than spring 74,) in the non-actuated position the tip 162 will remain seated, and the spring 174 will be partially compressed, equal to the amount of travel between the tip 162 and the valve seat 149 (determined at the non-actuated rest position). The above action essentially seals the secondary pressurizing chamber 152. The aforementioned situation can possibly lead to excessive pressure being placed upon seal 150, especially when utilized in an ABS or TC system which has a high-pressure hydraulic pump.

When there is still excessive pressure within the secondary circuit braking system, the pressure within the chamber 152 will force the secondary piston 32 to the right due to the V-block seal 177. The pressure within the second pressurizing chamber 152 will also retain the auxiliary piston 90 to the left. The above retention will cause the fingers 184 to pull the compensating valve 160 away from its closed position and ensure that the compensating passage is open therefore allowing fluid communication between the secondary brake circuit passage 18 and the reservoir passage 26. The seal 150 and 77 and the other brake system components such as hoses, lines, wheel cylinders are thereby protected.

The utilization of the seal 177 on the auxiliary piston 90 is an advantageous way to provide the positive open compensation feature for several reasons. Since the seal 177 provides a pressure boundary over the entire bore diameter there will always be a greater hydraulic force provided by the auxiliary piston to retain the compensating valve 160 at the forward open position, than the hydraulic pressure force provided by the ABS or TC pump through the secondary brake circuit passage 18 to close the compensating valve 160 due to the much smaller area of the valve seat 149. To make the force of the return spring 174 sufficiently large to ensure that the compensating valve 160 would remain open at the retracted position of the secondary piston 32 would mandate the use of springs with such a large spring force constant that it would be difficult if not impossible to operate the master cylinder 7. Additionally additional drilling of the master cylinder bore 12 to put in a positive stop to make contact with the compensating valve or to fix the position of the spring retainers in position are eliminated.

The location of the secondary piston 32 within the master cylinder is established by the spring force of the two return springs 74, 174, however, if desired a stop can be placed within the bore 12 soley for limiting the travel of the secondary piston 32 in a direction towards the spring clip 38.

While a few of the embodiments of the present invention have been explained it will be really apparent to those skilled in the art of the various modifications which can be made to the present invention without departing from the spirit and scope of this application as it is encompassed by the following claims.

I claim:

1. A dual brake circuit vehicle master cylinder, the master cylinder in combination comprising:

a housing with a longitudinal bore having a closed end, the bore having intersecting first and second reservoir passages and respective intersecting first and second brake circuit passage spaced from one another;

first and second pistons, the second piston being more adjacent the closed end of the longitudinal bore, the first and second pistons being slidably mounted within the housing bore sealably separating the respective reservoir passages from the brake circuit passage when the pressure within the bore exposed to the brake circuit passages exceeds the pressure within the bore exposed to the reservoir passage, the second piston also having a compensating passage with an inclusive valve seat allowing fluid communication between the second reservoir and the second brake circuit passage, and the second piston also having a support surface;

a compensating valve mounted within the second piston compensating passage having a head captured between the second piston support surface and the compensating valve seat being compliantly biased in a direction to mate with the second piston valve seat to seal off the compensating passage, the valve also having a stem connected with the head;

first and second return springs contacting the first and second pistons respectively for urging the pistons to a retracted position;

an auxiliary piston slidably mounted within the housing bore and separated from the second reservoir passage by the second piston, the auxiliary piston capturing the second return spring between itself and the second piston, the auxiliary piston having means to limit the relative movement of the compensating valve stem away from the auxiliary piston and the auxiliary piston being sealed within the housing bore when pressure within the bore urges the auxiliary piston in a direction away from the second piston whereby when the master cylinder is in a non-actuated position the auxiliary piston retains the compensating valve head at a clearance from the second piston valve seat to allow fluid communication through the second valve piston compensating passage and whereby after activation of the master cylinder if excessive pressure in the second brake circuit enters the master cylinder bore to retain the second compensating valve in a mated position with the second compensation valve seat the auxiliary piston will be urged by the excessive pressure to cause the compensating valve head to pull away from the first piston valve seat wherein excessive pressure within the second brake circuit passage will be exposed to the second reservoir passage.

2. A master cylinder as described in claim 1 further including a retainer insertable within the second piston compensating passage, the retainer providing a contact surface for the second piston return spring and also providing the support surface for the head of the second compensating valve and further where there is a coil spring in contact with the retainer support surface for biasing the second compensating valve head.

3. A master cylinder as described in claim 1 wherein said auxiliary piston utilizes a V-block seal.

4. A master cylinder as described in claim 1 wherein there is no positive stop for limiting the travel of the second piston toward said first piston.

5. A method of compensating a second brake circuit of a dual brake circuit master cylinder the method in combination comprising:

intersecting a bore of a housing with a first and second brake circuit passages and with respective first and second reservoir passages separated from one another;

separating the brake fluid passages from the reservoir passages with respective first and second pistons slidably mounted within the bore;

fluidly communicating the second reservoir passage with the second brake circuit passage through a second compensating passage which is inclusive of a valve seat;

supporting within the compensating passage of the second piston a second compensating valve having a stem at one end and a head compliantly biased towards the second piston valve seat;

sealing the second piston within the bore when the pressure within the bore exposed to the second brake circuit passage is greater than the pressure within the bore exposed to the second reservoir passage;

slidably mounting within the bore an auxiliary piston on a side of the second piston opposite the first piston;

limiting the travel of the stem of the compensating valve with respect to the auxiliary piston;

capturing between the second piston and the auxiliary piston a return spring biasing the second piston into the retracted position and causing the auxiliary piston to pull back the stem of the second compensating valve to provide a clearance between the head of the second compensating valve and the valve seat of the second piston in the a non-actuated position of the master cylinder; and sealing the auxiliary piston when the pressure within the bore urges the auxiliary piston in a direction away from the second piston whereby excessive pressure within the housing bore will cause the auxiliary piston to retain the second compensating valve head away from the second piston valve seat.

* * * * *